UNITED STATES PATENT OFFICE.

JOHN L. KANE, OF PHILADELPHIA, PENNSYLVANIA.

PROCESS OF PRODUCING DYES OF THE MAGENTA TYPE.

1,355,048.  Specification of Letters Patent.  Patented Oct. 5, 1920.

No Drawing.  Application filed December 24, 1919. Serial No. 347,063.

*To all whom it may concern:*

Be it known that I, JOHN L. KANE, a citizen of the United States, residing at Philadelphia, in the county of Philadelphia and State of Pennsylvania, have invented new and useful Improvements in Processes of Producing Dyes of the Magenta Type, of which the following is a specification.

The present invention relates to the production of dyes of the magenta type, that is to say, dyes consisting of an alkyl group or carbon associated with three amidoaryl groups, one of which groups is also combined with a halogen element or a mineral acid radical. The invention comprises the employment of starch paste or a starchy material broadly, in the first part of the process, namely, in the production of the rosanilin salt or equivalent body.

For the purpose of illustrating the invention, the production of magenta by the process of the present invention will be given, but it is to be understood that the invention is not restricted to the production of magenta since it is applicable to the production of various other dyes of the same general structural composition.

In producing magenta, 14 parts of anilin are mixed with 54 parts of the toluidin (consisting of a mixture of, say, 2 parts of ortho-toluidin and one part of para-toluidin), about 20 parts of dried pulverized starch paste then added, together with 67 parts of concentrated hydrochloric acid (about 1.2 specific gravity).

This mixture is heated until the temperature reaches about 130° C., when it is transferred to a suitable vessel, say, a round bottomed flask, and is there mixed with 8 parts of anilin, 26 parts of commercial toluidin and 55 parts of nitro-benzene. The mixture is then heated say in an oil bath, to about 100° C., when three parts of iron dissolved in a small amount of hydrochloric acid (forming $FeCl_2$) is slowly added.

The receptacle containing the mixture is connected with a reflux condenser and the temperature raised gradually to about 180° C., which temperature is maintained for about six to eight hours. This operation is considered as being completed when a sample withdrawn from the mixture on a glass rod solidifies on cooling.

The resulting mixture is then subjected to steam distillation, which drives off a mixture of toluidin and nitro-benzene. The resulting product is poured into about 500 parts of boiling water, well stirred, and concentrated hydrochloric acid slowly added until an acid reaction results, which will require about 12 parts of the acid. About 25 parts of common salt is then added and the whole mixture boiled for a few minutes. The solution contains the major part of the remaining unconverted hydrochlorids of anilin and toluidin and is poured off.

The residue is allowed to cool, forming a green brittle mass, which is then broken up and weighed (consider the weight of this as "X"), and extracted with a large quantity of, say, 1500 parts of boiling water containing, say, 12 parts of concentrated hydrochloric acid, which dissolves the magenta. This solution is filtered while boiling hot, and is then allowed to cool to about 60° C, when a small amount of a violet coloring matter separates out, which can be filtered off and forms a by-product. Salt is now added to the solution in amount equal to the quantity "X" above stated. After standing some time, the crude magenta dye separates out and is filtered off, and may be recrystallized from water containing a little hydrochloric acid.

The magenta dye produced in accordance with the present invention in which starch is employed in the first step of the process, is found to have certain advantages over magenta dyes produced in accordance with the prior art, namely, the dye produced in my process has a greater depth of color, a purer color and is found to have increased fastness, against light and washing, than those of the prior art.

The starch used in the process may be starch from any suitable source, such as starch from maize, starch from wheat, starch from potatoes and generally all starch made from grains or plants. In some instances, starchy materials, that is to say, materials consisting largely of starch, may be used in place of pure starch.

While I prefer to add the starch in the form of dried starch paste, raw starch can sometimes be used. The starch or dried starch paste may be first dissolved in the hydrochloric acid to be employed in the process.

The starch paste may conveniently be prepared by grinding up or comminuting 25 to 30 parts of dry starch with 100 parts of water and then heating (preferably while stirring) to a temperature of about 70 to 80° C. The starch paste may then be dried in any convenient manner and is preferably then powdered.

I claim:

1. In the production of alkyl tri-aryl-amin dyes, the step of reacting between aromatic amino bodies and an aromatic nitro body, and acid for the formation of a salt of alkyl tri-aryl-amin, while in the presence of a starchy material.

2. In the production of dyes, the step of reacting between anilin, toluidin, nitro-benzene and acid for the formation of para-rosanilin salt, in the presence of a starchy material.

3. In the process of making dyes, the herein described step which comprises reacting with aryl amin, aralkyl amin, a nitro-aryl body, an acid and a ferrous salt, all in the presence of a starchy material.

4. In the manufacture of dyes, the herein described step of reacting between anilin, toluidin, nitro-benzene, hydrochloric acid and ferrous chlorid, in the presence of starch.

In testimony whereof I affix my signature.

JOHN L. KANE.